(12) United States Patent
Bennett et al.

(10) Patent No.: US 9,587,622 B2
(45) Date of Patent: Mar. 7, 2017

(54) LIFTING TOOL FOR SERVICING OF WIND TURBINE GEARBOX COMPONENTS AND METHOD OF SERVICING USING SUCH A TOOL

(75) Inventors: Mark Bennett, Beresford (AU); David Hedger, Koroit (AU)

(73) Assignee: Vestas Wind Systems A/S, Aarhus N. (DK)

( * ) Notice: Subject to any disclaimer, the term of this patent is extended or adjusted under 35 U.S.C. 154(b) by 95 days.

(21) Appl. No.: 14/128,383

(22) PCT Filed: Jun. 26, 2012
(Under 37 CFR 1.47)

(86) PCT No.: PCT/DK2012/050213
§ 371 (c)(1),
(2), (4) Date: Aug. 1, 2014

(87) PCT Pub. No.: WO2013/000469
PCT Pub. Date: Jan. 3, 2013

(65) Prior Publication Data
US 2015/0285215 A1     Oct. 8, 2015

Related U.S. Application Data

(60) Provisional application No. 61/502,348, filed on Jun. 29, 2011.

(30) Foreign Application Priority Data

Jun. 28, 2011   (DK) ................................. 2011 70335

(51) Int. Cl.
*B66C 1/00*      (2006.01)
*F03D 1/00*      (2006.01)
(Continued)

(52) U.S. Cl.
CPC ............ *F03D 1/003* (2013.01); *B66C 23/207* (2013.01); *B66D 1/04* (2013.01); *B66D 1/60* (2013.01);
(Continued)

(58) Field of Classification Search
CPC  B66C 1/108; B66C 1/107; B66C 1/10; B66C 23/207; F03D 1/003; F03D 11/04;
(Continued)

(56) References Cited

U.S. PATENT DOCUMENTS 2,848,120 A * 8/1958 Harmon .................... B60S 5/00
                                                                                212/337
4,030,705 A * 6/1977 Bontrager ............... B66F 19/00
                                                                                180/298
(Continued)

FOREIGN PATENT DOCUMENTS

DE            9414356 U1 * 11/1994 ............... B60S 5/00
DE           20114909 U1     5/2002
(Continued)

OTHER PUBLICATIONS

European Patent Office, Extended European Search Report, issued in corresponding European Application No. 14181068.9-1705, dated Oct. 30, 2014, 6 pages.
(Continued)

*Primary Examiner* — Gabriela Puig
(74) *Attorney, Agent, or Firm* — Wood Herron & Evans LLP

(57) ABSTRACT

A lifting tool (2) for use in lifting components (1,5) from a wind turbine gearbox during service or repair comprises a frame-like structure comprising interconnected beams (4,6, 8,8,10,12,20,22,24,26,28) for securing to the gearbox housing once an upper housing part has been removed to provide an opening to the gearbox interior, the tool being secured to
(Continued)

the gearbox at a periphery of the opening, and further comprising one or more pulleys (36) mounted on the frame-like structure, a lifting chain, cable, wire or rope extending over the pulley or pulleys attachable to a component (1) within the gearbox, the frame-like structure comprising a number of inter-connectable modules.

15 Claims, 2 Drawing Sheets

(51) Int. Cl.
    *B66C 23/20*     (2006.01)
    *B66D 1/04*     (2006.01)
    *B66D 1/60*     (2006.01)

(52) U.S. Cl.
    CPC ........... *F05B 2230/61* (2013.01); *Y02B 10/30* (2013.01); *Y02E 10/726* (2013.01); *Y02P 70/523* (2015.11)

(58) Field of Classification Search
    CPC . F03D 11/045; B66D 1/04; B66D 1/60; B66F 19/00
    USPC ........ 294/67.1, 81.1, 81.5, 81.56, 67.3, 67.4
    See application file for complete search history.

(56) References Cited

U.S. PATENT DOCUMENTS

| | | | | |
|---|---|---|---|---|
| 4,928,927 A | * | 5/1990 | Fredrick | ............... B66F 19/005 |
| | | | | 254/279 |
| 5,456,371 A | * | 10/1995 | Klann | ..................... B66C 1/107 |
| | | | | 180/298 |
| 6,435,360 B1 | * | 8/2002 | Buchmeier | ............... B66C 1/10 |
| | | | | 212/180 |
| 8,366,373 B2 | * | 2/2013 | Wood | .................... B60P 1/5471 |
| | | | | 212/175 |

FOREIGN PATENT DOCUMENTS

| | | |
|---|---|---|
| DE | 102008013688 A1 | 10/2009 |
| EP | 1101934 A2 | 5/2001 |
| EP | 1677007 A2 | 7/2006 |
| EP | 2146090 A2 | 1/2010 |
| EP | 2147885 A1 | 1/2010 |
| WO | 9610130 A1 | 4/1996 |
| WO | 2005031159 A1 | 4/2005 |
| WO | WO 2012105971 A1 * 8/2012 ............. F03D 1/003 |

OTHER PUBLICATIONS

International Searching Authority, Search Report and Written Opinion issued in corresponding International Application No. PCT/DK2012/050213 dated Sep. 26, 2012, 12 pages.

Danish Patent Office, combined Search and Examination Report issued in corresponding Danish Application No. PA 2011 70335 dated Jan. 31, 2012, 4 pages.

International Bureau, International Preliminary Report on Patentability issued in corresponding International Application No. PCT/DK2012/050213 dated Jan. 7, 2014, 8 pages.

* cited by examiner

LIFTING TOOL FOR SERVICING OF WIND TURBINE GEARBOX COMPONENTS AND METHOD OF SERVICING USING SUCH A TOOL

FIELD OF THE INVENTION

The present invention relates to a tool for conducting service on gearboxes, in particular gearboxes for a wind turbine generator, through lifting components therefrom as part of a service or repair operation, and to a method of service or repair using such a tool.

BACKGROUND OF THE INVENTION

Gearboxes for wind turbines are required to operate near-continuously for extended periods of time, at very high loads and in challenging environmental conditions, ideally with minimal downtime for service or repair. Periodic inspection or service is nonetheless required, in order to check for signs of wear or other damage. The bearings within such gearboxes in particular can constitute a source of potential failure. Such inspection or service requires that the gearbox housing or casing be opened to allow access to the interior, with components such as shafts, gears and bearings within the gearbox being removed therefrom in order to allow full inspection.

Typically, such lifting is conducted with the use of a separate full height service crane alongside the wind turbine. In order to allow the crane access to the gearbox, the roof of the nacelle cover must be removed or opened. This operation utilising an external crane is extremely time consuming and expensive, and potentially dependent on calm weather conditions. Recent designs of wind turbine are commonly provided with internal nacelle cranes, either of a fixed type, or swivelable, or slidable on rails whereby the crane can be moved over the gearbox for assisting in a service operation. However, many older designs of turbines still in use today are not provided with such cranes.

It is proposed to provide a lifting tool which is able to be used for gearbox servicing and which can be brought up inside the turbine within the nacelle in order to lift components from within the gearbox, and without needing to remove or open the nacelle cover.

SUMMARY OF THE INVENTION

According to the present invention there is provided a lifting tool for use in lifting components from a wind turbine generator gearbox during service or repair comprising: a frame-like structure for securing to the gearbox housing from which an upper housing part has been removed to define an opening therein; one or more rollers or pulleys or the like mounted on the frame-like structure; a lifting chain, cable, wire or rope or the like extending over the rollers or pulleys attachable to a component within the gearbox; wherein a lower region of the frame-like structure is formed with connecting portions for engagement with the gearbox at the periphery of the opening.

This structure provides a tool which can be readily handled by service personnel and which can be utilised within the confines of the nacelle, without having to remove the nacelle cover or a part of the roof thereof. The configuration of the tool is particularly compact, and making a connection to the gearbox housing directly at the periphery of the opening affords a rigid connection.

The connecting portions may be flanges or feet, or other locating structures. These are preferably formed with holes for receiving fasteners which in use are aligned with the fixing holes in the gearbox used for securing the upper housing part, whereby the same fixing holes can be used. Alternatively, however, dedicated holes may be used.

The frame-like structure preferably comprises a number of releasably inter-connectable modules. These may be secured to each other by a variety of means, such as bolts or other common fasteners. The modular construction allows the tool to be conveniently handled by service personnel, brought up into the nacelle in a disassembled condition and assembled in-situ in the nacelle.

Preferably the tool includes one or more rollers or pulleys mounted on a shaft secured at an upper region of the frame-like structure. Generally, at least two rollers or pulleys are provided for allowing lifting connection to opposite sides of a part of the component to be lifted. It may be arranged that a third roller or pulley is provided, which is a redundant roller, used when it is desired to re-locate one of the other rollers for example for better positioning of the lifting chains or the like. The shaft preferably extends laterally across the centre of the frame-like structure in a direction parallel to the shaft being lifted.

The hoisting device arranged on the chains or the like may take a variety of forms, but is conveniently a manual lever hoist, but may alternatively be a winding drum type hoist on which the chain or the like is wound.

In a further aspect the invention resides in a method of servicing a wind turbine gearbox utilising a lifting tool as described above, the method comprising the steps of arranging the tool in the wind turbine generator, removing an upper part of the gearbox housing to provide an opening to allow internal access, securing the tool on the gearbox housing over the opening with a lower region of the tool engaging the housing at the periphery of the opening by means of connecting portions on the lower region of the tool, securing the chain, cable, wire or rope to a component to be hoisted, and operating a hoisting device acting on the chain, cable, wire or rope to lift the component from the gearbox.

The tool is secured to the gearbox housing by means of the connecting portions which are secured for example by bolts to the housing. It is preferred if the tool is secured to the housing using the fixing points for the upper housing part, thereby avoiding the need for additional fixing points to be provided.

The frame-like structure preferably comprises a number of inter-connectable modules, is brought to the wind turbine generator in a disassembled condition, and is assembled over the housing.

The method may be directed particularly to lifting a shaft and its associated gear or gears from the gearbox, such as an intermediate shaft, with the chain, cable, wire or rope or the like secured to a fixing point or points on a gear of the intermediate shaft in order to lift the shaft from the gearbox.

BRIEF DESCRIPTION OF THE DRAWINGS

Embodiments of the invention are described, by way of example only, with reference to the following drawings in which.

DETAILED DESCRIPTION OF THE PREFERRED EMBODIMENTS

As discussed above the invention concerns a lifting tool for use in the servicing of gearboxes, which has particular applicability for gearboxes employed in utility-scale wind turbine generators (hereinafter "wind turbines").

The gearbox of a utility-scale wind turbine can take a number of configurations but typically comprises a main low speed shaft to which the wind-driven rotor is connected, a high-speed output shaft extending from the gearbox, to which the electrical generator is connected, and a rotational speed-enhancing gear train therebetween. Commonly, the gear train comprise a number of planetary gear stages, usually two or three, and one or more further speed-increasing gear stages between the output of the planetary gear stage or stages and high speed shaft. For example, one particularly common form has a two-stage planetary gear and a single stage of spur gear connecting to the high speed shaft via an intermediate shaft. The lifting tool of the invention is particularly, although not exclusively, adapted for lifting an intermediate shaft from such a gearbox in order to allow inspection of the shaft, its gear wheels and/or its bearings. In the figures the intermediate shaft is indicated 1, its associated gear indicated 5 and lifting points on the gear indicated 3.

Figure 1:
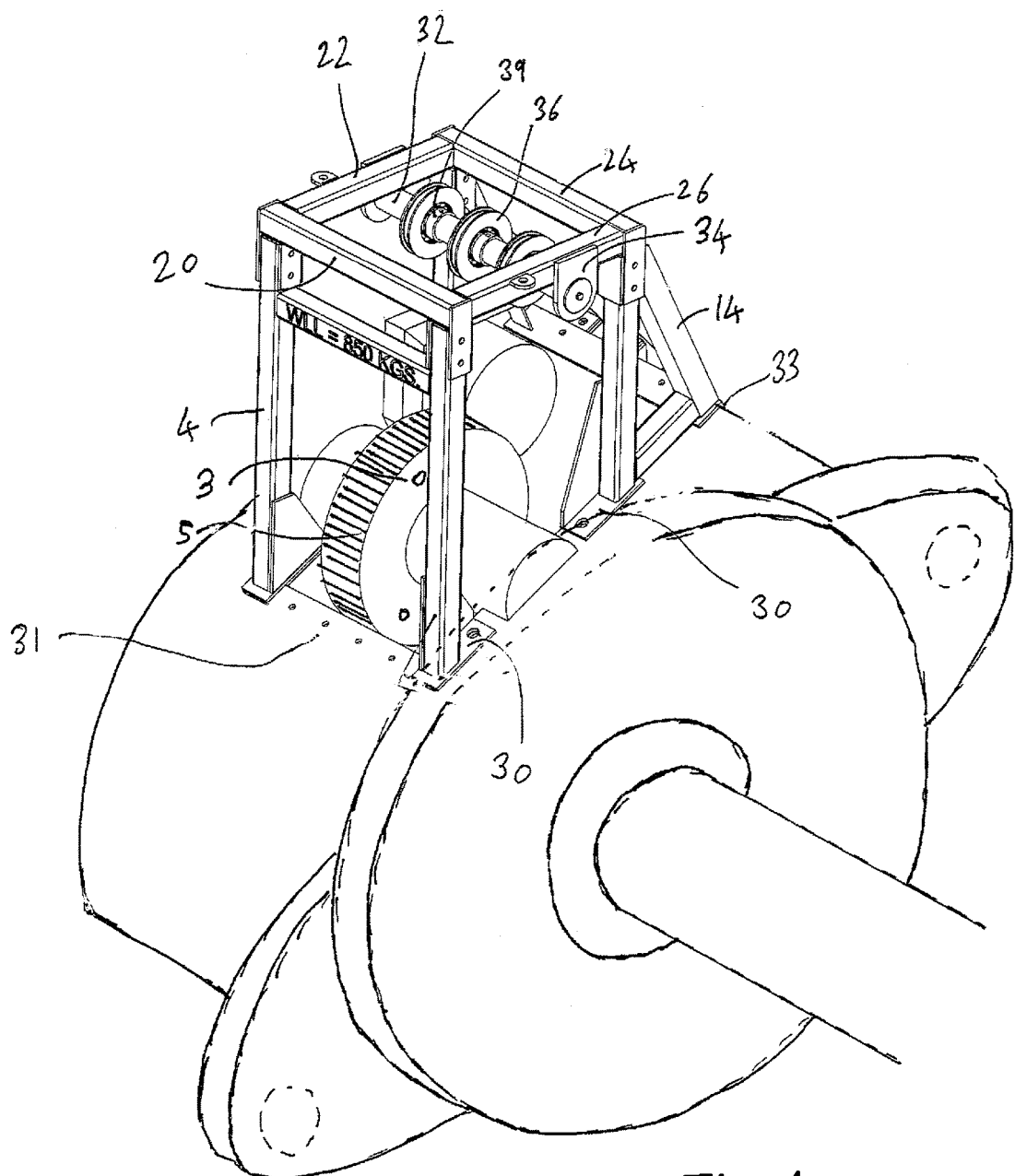
FIG. 1 shows a lifting tool in accordance with a first embodiment of the invention as fitted to a gearbox housing.
Figure 3:
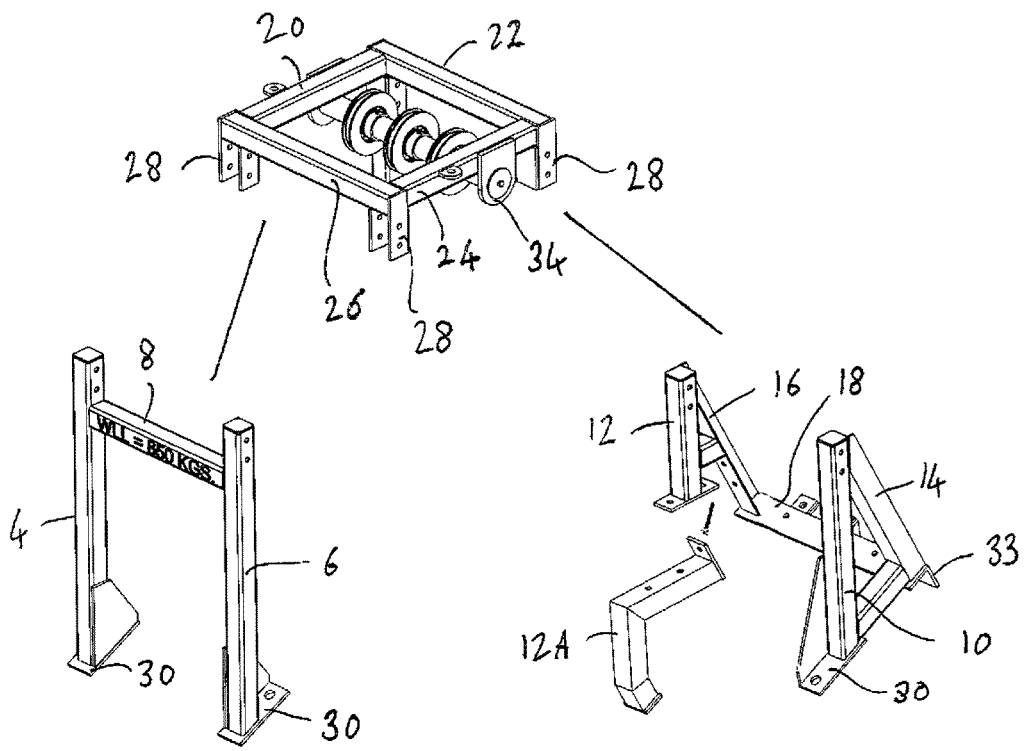
FIG. 3 shows the lifting tool in a disassembled condition.

Turning more closely to the drawings, FIG. 1 shows the lifting tool generally designated 2 as fitted to a wind turbine gearbox. In order to allow access to internal components within the gearbox, the gearbox housing comprises a removable upper part or lid (not shown in the drawings), which can be opened by service personnel to access the gearbox interior. This upper housing part is secured to the main gearbox housing by fasteners, generally bolts or the like which engage in threaded openings in the main gearbox housing. The lifting tool 2 comprises a frame-like support structure adapted to be fitted to the gearbox casing over the opening existing once the upper housing part has been removed. The periphery of this opening defines a generally planar surface inclined at an angle of about 30 degrees to the horizontal about an axis parallel to the axis of the gearbox main shaft. The support structure has an open box-like form which is constituted by a number of interconnected beams. These are arranged in a number of separate modules, whereby each module is of a dimension and weight such that it can be individually carried up into the nacelle of the wind turbine by service personnel. More particularly, as illustrated in FIG. 3 a pair of legs 4 and 6 are interconnected through a crosspiece 8 in a first module. A second module is formed by legs 10, 12 and 12A and rear braces 14, 16 interconnected through a crosspiece 18. Legs parts 12 and 12A are separate components which can be bolted together, part 12A introducing a dog-leg to accommodate an upstanding feature in the gearbox, such as the top of the high speed shaft. Crosspiece 18 carries a number of anchor points 19 for lifting chains or the like, as discussed further below. A third module has a generally square form of interconnected beams 20, 22, 24 and 26 to which the first and second modules are releasably connectable. To this end the third module is formed with depending pairs of connection flanges 28 at each corner to which the upper ends of the legs of the first and second modules can be releasably connected by bolts or the like.

The lower ends of the legs 4, 6, and 10 are formed with respective flanges 30 provided with fixing holes through which fasteners such as, bolts or the like can be inserted to bolt the lifting tool to the gearbox housing at the periphery of the opening. These flanges 30 define with an underside of the crosspiece 18 a planar surface for abutting the opening periphery. The flanges are preferably arranged to utilise some or all of the existing holes (some of which are visible at the lower left side of the opening periphery, as indicated 31) in the gearbox housing by which the upper removable housing part is in operative use secured, or they may be arranged to align with dedicated holes within the gearbox housing.

The crosspiece 18 of the second module is formed with a depending ledge 33. This ledge 33 engages an edge provided on the gearbox housing adjacent the opening. This facilitates the correct location of the tool particularly as it is being initially located on the gearbox housing, and holding the tool in position on the inclined surface whilst the first fasteners are being attached.

Figure 2:
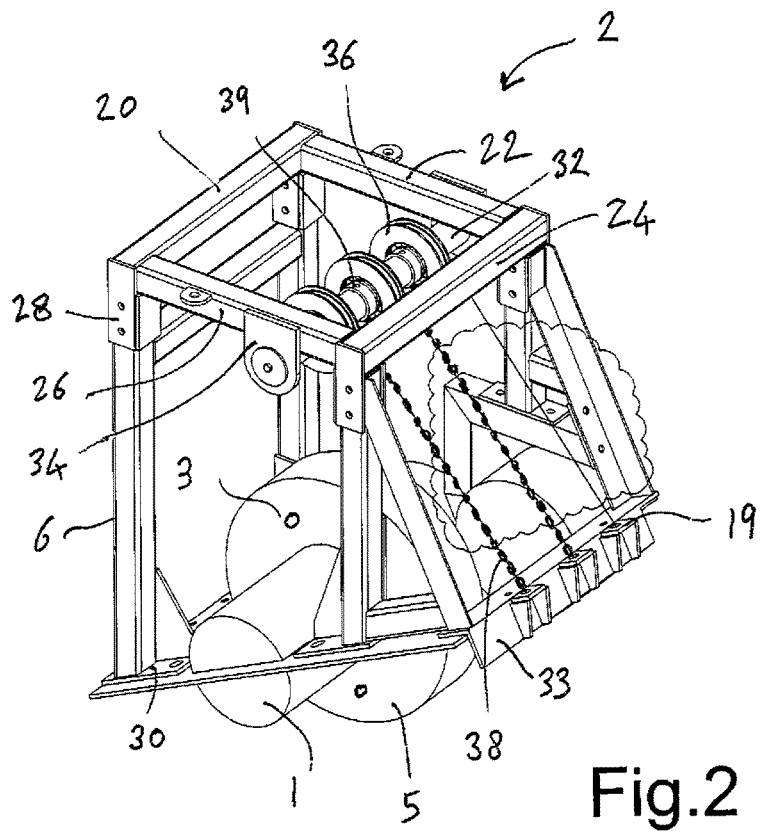
FIG. 2 shows the lifting tool from the rear.

The third module carries a shaft 32 thereon supported by a pair of opposed flanges 34, within aligned holes thereof. The shaft may be removable from the third module, to further minimise its weight. The shaft 32 supports a number of rollers or pulleys 36 over which are lead hoisting chains, cables, wires or ropes or the like, indicated 38 in FIG. 2 although omitted from the other figures for reasons of clarity. These are secured to the frame of the tool at the respective anchor points 19. In a preferred form two rollers 36 and their respective chains or the like are associated with respective lifting points on the component to be lifted, whilst a third constitutes a redundant roller and chain which can be utilised if it is necessary to unload and re-position one of the other rollers along the shaft, for example in order to more appropriately align the pulley with respect to the lifting point on the component. The rollers 36 may be held in position by locking collars 39. In the illustrated example of lifting of an intermediate shaft 1 from the gearbox, lifting points indicated 3 in FIG. 2 are preferably provided on the intermediate shaft gear 5, spaced around the gear on its opposite faces. A lifting ring or eye bolt (not shown) can be fitted into an appropriate lifting point 3 which is uppermost or most conveniently disposed to allow access and safe lifting. In the case of a chain-based lifting system, a conventional manual lever-type hoist can be provided (not shown) on each chain in order to provide the lifting force on the chain.

The tool must of course be rated for lifting the appropriate weight of the component to be lifted. In the case of an intermediate shaft this typically has a weight of about 800 Kg. The tool can be constructed of size and weight of the individual modules such that each can be readily carried by service personnel up into the nacelle. For example, a tool formed of steel can be dimensioned such that individual modules each weigh less than about 22-25 kg. It is intended that the tool is formed of a common metal or alloy such as steel or aluminium, but many other metals or other stiff materials might equally be utilised The lifting force can be provided by various means, but most conveniently manual lever-type hoists can readily provide the appropriate lifting force to lift a shaft of this weight, for example two 1.5 tonne lever hoists may be utilised (not shown) disposed adjacent the anchor points.

It will be appreciated that the tool can take a variety of other specific forms. Although the illustrated embodiment has a generally square open box-like form a variety of other forms such as tripod-like or polyhedral shapes are possible. The precise dimensions and orientations and disposition of legs and other components of the frame can be considerably varied provided that the tool connections co-operate with appropriate connections on the gearbox. Additional support structures or beams may be provided. The legs may be substituted or partly substituted by planar components, webs, or plates or the like. The interconnections on the gearbox maybe adapted, for example by providing grooves, slots or other indentations in order to receive the connection points on the tool.

The installation and use of the tool is as follows. The rotor of the wind turbine must be brought to standstill and the drive train appropriately locked, through locks or brakes or the like as is standard practice. The tool 2 is brought up into the nacelle by service personnel, preferably in a disassembled condition with the modules disconnected from each other. Within the nacelle, the service personnel remove the upper housing part of the gearbox, exposing the component to be lifted therefrom. The tool 2 is then assembled on the gearbox. The precise sequence of steps can be varied, but advantageously the second module is put in position first, engaging the ledge 33 over an edge on the gearbox housing, and bolting this in place. The third module is then attached to the second, and finally the first module is bolted to the second and to the periphery of gearbox opening. The shaft 32 and its pulleys, if not already present on the second module can then be installed. The lifting chains, cable, wire, rope or the like 38 are lead over the respective pulleys, secured at one end at their anchoring points 19, extending around a hoisting device and at their opposite ends secured to the lifting eyes which are connected into lift points 3 on the component to be lifted.

Prior to lifting it may be necessary to rotate the components within the drive train a small degree in order to disengage or facilitate the disengagement of meshing engagement of gears. This can be done manually, as is known, using a turner tool engaging a part of the drive train. Hoisting is then effected using the lever hoists or other appropriate lifting devices acting on the chains or the like 38, thereby lifting the component, such as the intermediate shaft 1 its gear(s) and its bearings sufficiently from the gearbox, in order to allow inspection, service or if necessary repair. After such service, the sequence is reversed, the component being re-seated, disconnected from the lifting tool 2, the tool 2 then disconnected from the gearbox and disassembled, and the gearbox opening closed by re-attaching the upper housing part.

The box-like frame configuration of the tool as described provides a very compact and rigid form, and making a rigid connection to the gearbox housing through the immediate periphery of the opening While the invention has been particularly shown and described with reference to the preferred embodiments thereof it will be understood by those skilled in the art that the foregoing and other changes in form and detail may be made without departing from the scope of the invention.

The invention claimed is:

1. A lifting tool for use in lifting components from a wind turbine gearbox housing during service or repair comprising:
a frame-like structure for securing to the gearbox housing from which an upper housing part has been removed to define an opening therein;
one or more rollers or pulleys mounted on the frame-like structure; and
a lifting chain, cable, wire or rope extending over the rollers or pulleys attachable to a component located within the gearbox housing and to be lifted;
wherein a lower region of the frame-like structure is formed with connecting portions for engagement with the gearbox housing at the periphery of the opening for fully supporting the lifting tool on the gearbox housing.

2. The lifting tool according to claim 1 wherein the connecting portions comprise flanges.

3. The lifting tool according to claim 1 wherein the connecting portions are formed with holes which in use align with fixing holes in the gearbox housing for the upper housing part.

4. The lifting tool according to claim 1 wherein the frame-like structure comprises a number of releasably inter-connectable modules.

5. The lifting tool according to claim 1 wherein the frame-like structure is generally box-like.

6. The lifting tool according to claim 1 wherein the one or more rollers or pulleys are mounted on a shaft secured at an upper region of the frame-like structure.

7. The lifting tool according to claim 1 wherein the one or more rollers comprise a plurality of rollers at least one of which is a redundant roller.

8. A method of servicing a wind turbine gearbox utilising a lifting tool according to claim 1, the method comprising the steps of:
arranging the tool in the wind turbine generator;
removing an upper part of the gearbox housing to provide an opening to allow internal access;
securing the tool on the gearbox housing over the opening with a lower region of the tool engaging the gearbox housing at the periphery of the opening, by means of connecting portions on the tool, such that the tool is fully supported on the gearbox housing;
securing the chain, cable, wire or rope to a component to be hoisted; and
operating a hoisting device acting on the chain, cable, wire or rope to lift the component from the gearbox housing.

9. The method according to claim 8 wherein the connecting portions are secured to the gearbox housing by bolts.

10. The method according to claim 8 wherein the tool is secured to the gearbox housing using fixing points for the upper housing part.

11. The method according to claim 8 wherein the frame-like structure comprises a number of inter-connectable modules, is brought to the wind turbine generator in a disassembled condition, and is assembled over the gearbox housing.

12. The method according to claim 8 wherein the component to be lifted is a shaft and its associated gear or gears.

13. The method according to claim 12 wherein the component to be lifted is an intermediate shaft with its associated gears.

14. The method according to claim 8 wherein the method includes securing the chain, cable, wire or rope to a fixing point or points on a gear of the intermediate shaft.

15. An assembly for use in lifting components from a wind turbine gearbox housing during service or repair comprising:
a wind turbine gearbox housing from which an upper housing part has been removed to define an opening therein; and
a lifting tool comprising:
a frame-like structure for securing to the gearbox housing;
one or more rollers or pulleys mounted on the frame-like structure; and
a lifting chain, cable, wire or rope extending over the rollers or pulleys attachable to a component located within the gearbox housing and to be lifted;

wherein a lower region of the frame-like structure is formed with connecting portions engaged with the gearbox housing at the periphery of the opening and wherein the gearbox housing fully supports the lifting tool.

* * * * *